Figure 1:
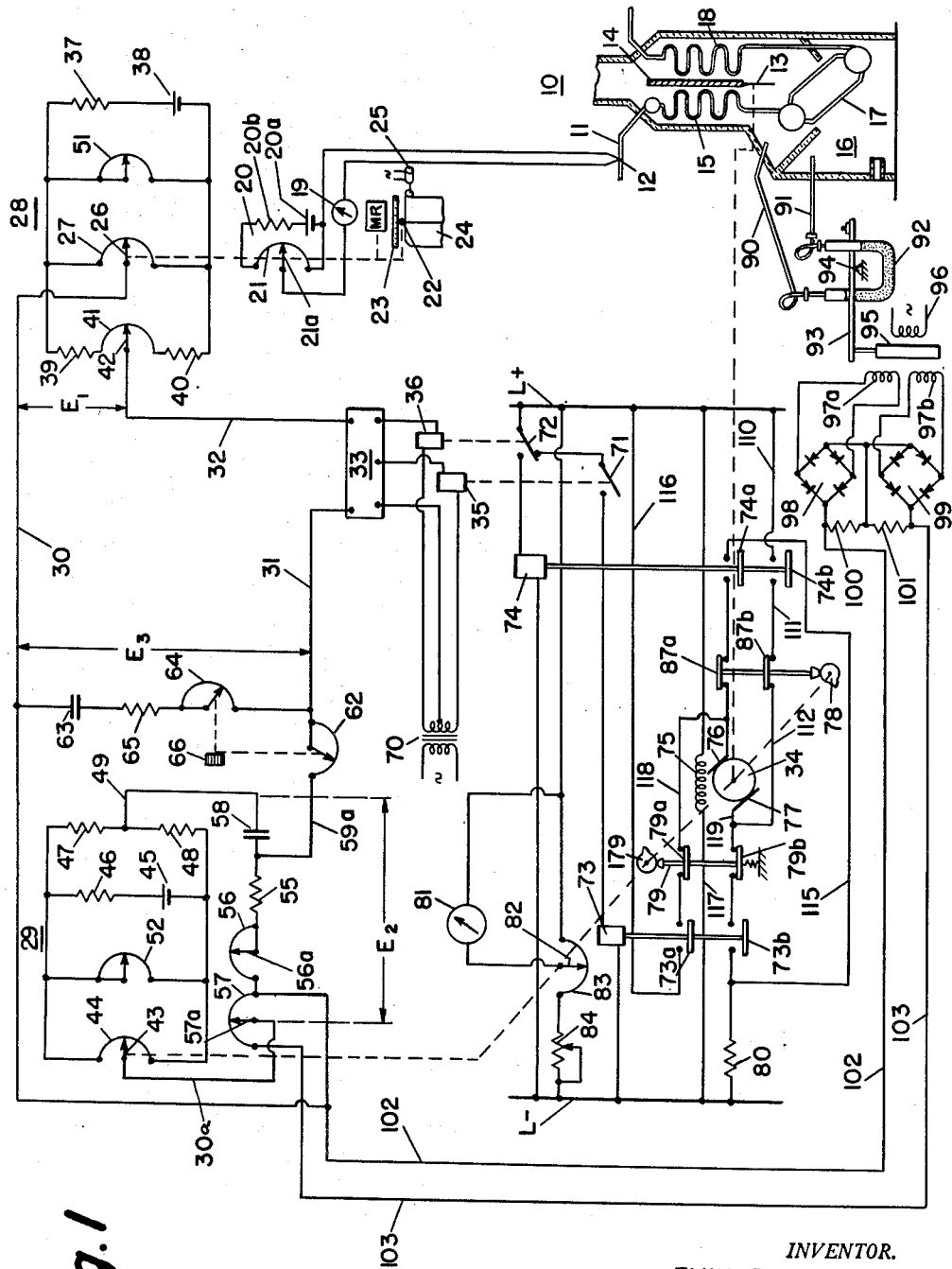

Sept. 7, 1954     E. T. DAVIS     2,688,717
PROPORTIONAL RESET REBALANCEABLE CONTROL SYSTEM
Filed Feb. 14, 1952     5 Sheets-Sheet 1

INVENTOR.
ELWOOD T. DAVIS
BY
Woodcock and Phelan
ATTORNEYS

Sept. 7, 1954          E. T. DAVIS          2,688,717

PROPORTIONAL RESET REBALANCEABLE CONTROL SYSTEM

Filed Feb. 14, 1952          5 Sheets-Sheet 4

*INVENTOR.*
ELWOOD T. DAVIS
BY
Woodcock and Phelan
ATTORNEYS

Patented Sept. 7, 1954

2,688,717

UNITED STATES PATENT OFFICE 2,688,717

PROPORTIONAL RESET REBALANCEABLE CONTROL SYSTEM

Elwood T. Davis, Havertown, Pa., assignor to Leeds and Northrup Company, Philadelphia, Pa., a corporation of Pennsylvania Application February 14, 1952, Serial No. 271,486

21 Claims. (Cl. 318—28)

This invention relates to automatic control systems of the type used for controlling the magnitude of a controlled variable, which may be any variable quantity or condition such as temperature, pH values, rate of flow or other physical, chemical or electrical conditions or characteristics and having a storage element providing a time-function control, and has for an object the provision of methods of and apparatus for introducing any desired number of components of control action into the operation of the system.

In accordance with the present invention, auxiliary signal-generating means are provided for producing a controlled potential of polarity and of magnitude representative of a variable with a means for applying that controlled potential to a control system which so positions a compensating means as to vary the magnitude of the controlled variable to maintain it at predetermined values.

In one preferred form of the invention the potential developed by the auxiliary signal-generating means is applied in circuit with the potential developed in response to adjustment of the compensating means so as to make effective adjustment of the compensating means in proportion thereto. In other forms of the invention the developed potential of reversible polarity may be introduced in manner to make effective adjustment of the compensating means in accordance with the rate of change of the developed potential. The developed potential may be introduced into a resistance-capacitance network associated either with a signal-responsive means operable upon change in the magnitude of the controlled variable or it may be made effective in connection with changes resulting from adjustment of the compensating means.

The present application is a continuation-in-part of my earlier filed application Serial No. 149,775, filed March 15, 1950, now U. S. Patent No. 2,666,170, and of my application Serial No. 256,070, filed November 13, 1951, now abandoned.

For further objects and advantages of the invention and for a detailed description of several modifications, reference is to be had to the following description taken in conjunction with the accompanying drawings, in which:

Figs. 1–6 respectively diagrammatically illustrate systems including different types of apparatus to which the invention has been applied and different modifications of the invention.

Referring to Fig. 1, the invention has been shown in one form as applied to a balanceable control system of the electrical type arranged to control a measured variable, such for example as the temperature of super-heated steam generated in a furnace 10 and delivered to any desired load, such for example as a turbine (not shown) by way of steam line 11. The temperature of the steam in line 11 as measured by a thermocouple 12 may be varied by changing the setting of a compensating means or the position of a condition-varying element shown as a damper 13 for regulating the division of combustion gases flowing in one or the other of the chambers separated by a diving wall 14. Combustion gases flowing from the fire box and from a boiler section 17 of the furnace are divided, a part passing in heat-exchange relation with a super-heater coil 15, and the remaining part passing in heat-exchange relation with an economizer coil 18, the ratio of the flow of the combustion gases or the relative amount of heating of the coil 15 being determined by the division of the combustion gases as determined by the setting of damper 13.

If the temperature of the super-heated steam in line 11 decreases from a predetermined value, generally referred to as the control point, the change in temperature is detected by the thermocouple 12 which, in manner later to be explained in detail, unbalances a control network 28 for application to an amplifier 33 of a signal which produces energization of a motor 34 for rotation in a direction to move the damper 13 in a direction to divert more combustion gases into heat-exchange with the coil 15. If the temperature in steam line 11 rises above the control point, the action will be in the reverse direction for reverse adjustment of damper 13 to decrease the heating of the steam passing through coil 15. While a simple proportional control action of the type generally referred to is useful and is used in many control applications, other applications include the requirements of reset action and of rate action. Even with these additional control actions included in the system, something is left to be desired in the utilization of additional factors arising in the operation of the system for maintaining the controlled variable at a predetermined value and when a change occurs to adjust the system in advance of change in magnitude of the controlled variable. More particularly, in the operation of furnace 10 it has been found that closer regulation of the controlled variable may be attained if there be superimposed on the control system an addditional control action from a variable other than super-heater temperature. Such an added control action, which is an anticipatory control action, has been illustrated as one derived from a differential of pressure in furnace 10 as detected by a manometer 92. Variation in the differential of pressure in the upper and lower part of the furnace 10 is utilized to introduce a voltage into the control network 29 which includes an element 43 driven by motor 34 to produce a voltage balance at the amplifier 33 after a voltage unbalance produced by network 28 by change in the temperature of thermocouple 12.

The manner in which the control networks 28 and 29 function in response to change of the controlled variable will now be described more in detail after which there will be described the operation as a whole as affected by the auxiliary control action from the signal-producing means actuated by manometer 92.

The temperature of the steam in line 11 is measured by thermocouple 12 and an associated measuring system shown as comprising a galvanometer 19, a potentiometer circuit 20 including a battery 20a, a fixed resistor 20b and a variable resistor or slidewire 21 and an adjustable contact 21a. The measuring system is preferably of the type fully disclosed in Squibb Patent No. 1,935,732, the galvanometer 19 forming a part of a mechanical relay MR which serves under the control of the galvanometer relatively to adjust contact 21a on slidewire 21 to produce in the galvanometer circuit a voltage balance with the voltage output of thermocouple 12. The mechanical relay MR may drive suitable indicating means, as for example, an index 22 relative to scale 23. There may be combined with index 22 a pen movable relative to a calibrated chart 24 driven at constant speed by a motor 25. Other types of temperature-measuring systems may be utilized, such for example as shown in Williams Patent No. 2,113,164.

Simultaneously with movement of movable contact 21a in response to changes in temperature of the super-heater line 11, provision is made for moving an adjustable contact 26 with respect to a slidewire 27 in an electrical network designated generally as control network 28. Control network 28 is interconnected with control network 29 by way of line 30 and together networks 28 and 29 form a balanceable control system having an output circuit which by way of lines 31 and 32 is connected to the input terminals of an amplifier 33, preferably of the high-impedance, high-gain type.

It will be observed that control slidewire 27 is connected through a resistor 37 to a source of power, shown as battery 38. There is likewise connected in parallel with slidewire 27 a branch circuit including resistors 39 and 40 and a slidewire 41. One or both of the resistors 39 and 40 may be omitted if desired. The unbalance voltage, $E_1$, from network 28 appears between the conductor 30 and a conductor 32 extending from movable contact 42 of slidewire 41 to one side of the amplifier 33. The magnitude of voltage $E_1$ varies with change in relative position between contact 26 and slidewire 27. With any selected position between contact 26 and slidewire 27 the magnitude of voltage $E_1$ may be made zero by varying the setting of contact 42 relative to slidewire 41 and, hence, the control point may be established for any desired position of contact 26 along slidewire 27. Accordingly, the relative position between slidewire 41 and contact 42 predetermines the control point or the temperature at which the steam is to be maintained in line 11.

It is to be understood that it is a matter of choice as to whether the slidewires or resistance elements be bodily moved relative to associated stationary contacts, or whether the contacts be moved relative to the resistance elements. For simplicity, all contact elements have been indicated as adjustable in the accompanying drawings.

If for each change in position of contact 26 relative to slidewire 27 the motor 34 moves contact 43 relative to slidewire 44 by a corresponding amount to restore a voltage balance at the input terminals of amplifier 33, it will be understood that proportional action is provided. That is to say, for a given adjustment of contact 26 with respect to control slidewire 27, there will be a corresponding follow-up adjustment of damper 13 and of contact 43 by motor 34.

If for the moment there be neglected the branch circuit including capacitor 63 and resistor 65 and it be assumed that conductor 49 extends directly to one side of the amplifier input in place of conductor 31, and contact 57a is at its extreme right-hand position, such a proportional action will be provided. The network 29 includes the battery 45 and a resistor 46 which develops a potential difference across the slidewire 44 and across the branch including resistors 47, 48. The output voltage $E_2$ of network 29 will be varied in magnitude in accordance with change in position of contact 43 relative to slidewire 44.

Mathematically, for a given change in the variable condition or characteristic, $\theta$, the adjustment of slidewire contact 43 and damper 13 will be equal to $K_1\theta$ where $K_1$ is the proportional-action constant. In order to provide adjustment of the proportionality, slidewire resistors 51 and 52 respectively are connected in parallel with slidewires 27 and 44. If then resistor 51 is set to make the voltage across slidewire 27 greater than that across slidewire 44, a greater relative movement of contact 43 with respect to slidewire 44 would be required to produce a voltage $E_2$ between line 49 and line 30a equal to the changed value of voltage $E_1$ between lines 30 and 32. The adjustment of either resistor 51 or 52 is referred to as a throttling range or proportional band adjustment. In practice, in order to produce maximum change of the proportional band, resistors 51 and 52 may be mechanically linked for simultaneous adjustment in opposite directions.

The reset control action, already referred to, is provided by means of a reset capacitor 58 and a reset resistor including a fixed resistance 55 and a variable resistance 56. The reset capacitor 58 is connected in line 49 leading to the common junction between resistors 47 and 48 and one end of the reset resistor. Capacitor 58, resistor 55 and slidewire resistor 56 introduce a correction for droop resulting from changes in load conditions on the process under control. Such a correction is introduced to maintain the magnitude of the controlled variable at a predetermined value notwithstanding changes in load. This correction is referred to by those skilled in the art as reset or droop-corrective action, meaning a corrective action which assures return of the controlled variable to the control point with change in load. Mathematically, the reset action or adjustment of the position of damper 13 may be expressed as a correction or adjustment of magnitude corresponding with the summation with respect to time of the deviation of the condition from a predetermined value. This action is equal to $K_2 \int \theta dt$ where $K_2$ is a constant and $dt$ is equal to the derivative with respect to time.

In the system of Fig. 1, there is also provided rate control action, that is to say, an adjustment of damper 13 by motor 34 in accordance with the rate of change of the controlled variable. Such action is introduced by means of a slidewire resistor 62 and capacitor 63.

Mathematically, the rate control action may be expressed by saying that there is provided a component in the adjustment of damper 13 equal to $$K_3 \frac{d\theta}{dt}$$

where $K_3$ is a constant. This circuit likewise includes a slidewire resistance 64 and a fixed resistance 65. As indicated, slidewire resistances 62 and 64 may be mechanically coupled for dual adjustment by means of knob 66 in accordance with the system disclosed in my said application, Serial No. 149,775, filed March 15, 1950. As shown, resistor 62, in line 31 and in series with the input terminal of amplifier 33, attenuates the voltage produced across resistors 55 and 56. Accordingly, that voltage must be made greater by an amount equal to the attenuation in order to produce between conductors 30, 31 a signal voltage equal to the voltage $E_1$. It will be made greater by further relative movement of contact 43 on slidewire 44 to introduce a control component related to the rate of change of the variable condition under control. The manner in which this is accomplished will now be explained.

In brief, as contact 43 is moved by motor 34 in response to a continuous change in the controlled variable, a continuously changing voltage is developed between lines 30 and 59a. That voltage produces a continuous flow of charging current through slidewire resistor 62, slidewire resistor 64, and resistor 65 to capacitor 63. Since there will be a voltage drop in slidewire resistor 62, the movement of contact 43 will be advanced by that amount needed to overcome the attenuation due to slidewire resistor 62. If the controlled variable be rapidly changing, then the contact 43 will be rapidly moved. The rate of change of voltage will, therefore, be increased and with the increased rate of change of voltage there will be an increased current flow through slidewire resistor 62 to increase the attenuation and to increase the movement required of contact 43 in order to achieve balance. Hence, the effect of resistor 62 and of the branch including the capacitor 63 is to cause an additional movement of damper 13 and contact 43 in accordance with the rate of change of the controlled variable.

Referring now to the control circuit for motor 34, Fig. 1, it will be seen that relays 35 and 36 are selectively connected to a source of power, such as transformer 70, by the amplifier 33. When the input signal to amplifier 33 is of one polarity the relay 35 will be energized. When the input signal is of the opposite polarity the relay coil 36 will be energized. Relays 35 and 36 through their respective contacts 71 and 72 control the energization of switches or contactors 73 and 74 for energization of motor 34 in one direction or the other. When relay 36 is energized the contactor 74 operates to connect by way of contacts 74a and 74b the brushes 76 and 77 across direct-current lines L— and L+. The motor 34, of the shunt-connected type with field winding 75, is then energized through a circuit which may be traced from L+ by way of line 110, contact 74b, conductor 111, contact 87b, conductors 112 and 119, brush 77, the armature, brush 76, contact 87a, contact 74a, conductor 115, and by resistor 80 to line L—.

When relay 35 is energized the contactor 73 is operated to close circuits through its contacts 73a and 73b for rotation of the motor in the reverse direction. The circuit may be traced from line L+ by way of conductor 116, contact 73a, contact 79a of limit switch 79, conductor 118, brush 76, the armature, brush 77, contact 79b, contact 73b, and by way of resistor 80 to the other line L—.

The position of the final control element, damper 13, may be indicated by a meter, such as voltmeter 81, connected to a movable or adjustable contact 82 variable in position along a slidewire 83 in response to movement of motor 34 and damper 13. As shown, slidewire 83 may be connected directly between lines L+ and L— through an adjustable voltage-dropping resistor 84. It will be apparent to those skilled in the art that the voltage across meter 81 may be made to vary in accordance with the position of damper 13 so that the indicating scale on meter 81 may be calibrated in accordance with that position. The calibration of meter 81 may be made by adjustment of resistor 84.

As mentioned hereinbefore the connection between adjustable contact 43 and slidewire resistor 56 is made through a slidewire 57 and a movable contact 57a. In the embodiment of Fig. 1, slidewire 57 is provided to introduce the further electrical control signal or quantity representative of another variable condition. In the present arrangement, the flow of combustion air in fire box 16 may be taken as exemplary of such other variable condition from which the anticipatory control is derived. The flow of combustion air is measured by draft tubes 90 and 91 connected to a tilting U-tube manometer 92 mounted upon a lever arm 93 supported for rotation upon a pivot 94. By reason of the difference in pressure detected by tubes 90 and 91, the fluid, such as mercury, in U-tube 92 is caused to assume a difference in elevation in the two legs of the tube, as illustrated. Lever arm 93 positions a core member 95 mounted adjacent the outer end thereof with respect to a primary coil 96 and a pair of secondary coils 97a and 97b. Primary coil 96 is connected to a suitable source of alternating current so that secondary windings 97a and 97b are energized in accordance with the flux linkage between the primary and secondary coils by movable core 95. The position of core member 95 effectively controls the flux and the magnitude of voltage produced in each of the secondary windings 97a and 97b. Full-wave rectifiers 98 and 99 are respectively connected to secondary windings 97a and 97b. The alternating voltage developed in each of the coils is converted to a direct-current signal by rectifiers 98 and 99 and applied to voltage-dividing resistors 100 and 101 so that there is provided a direct-current signal between lines 102 and 103 whose magnitude and sense is determined by the position of core 95 in accordance with the difference in pressure between draft tubes 90 and 91.

Either the full direct-current signal between lines 102 and 103 may be introduced into the resistance-capacitance network including the reset resistors 55 and 56 and capacitor 58, or by adjustment of movable contact 57a only a desired portion or fraction of this additional control signal may be introduced. The foregoing circuit is illustrative of numerous modifications of other balanceable control systems which may be utilized in connection with the present invention.

It is to be further observed that the signal component introduced by way of resistor 57 is of reversible polarity, the particular polarity depending upon whether the signal component due to rectifier 98 exceeds that of rectifier 99 or vice versa. Thus, the effect of the added component by way of resistor 57 will be to produce a signal on amplifier 33 which will, or will tend to, operate motor 34 in one direction or the other depending upon whether the control element 95 is displaced to one side or to the other of its illustrated neutral position and by an amount depending upon the magnitude of the displacement.

The voltages induced in coils 97a and 97b may be considered as component signals whose algebraic sum is applied to network 29. Those component signals may be produced by any other suitable means provided in accordance with the requirements of the system to which the invention is applied.

While the auxiliary control signal applied through resistor 57 has been described as being of reversible polarity, it will be understood that this signal may be of unidirectional sense, where such a control signal is desired, and variable only in magnitude.

Figure 2:
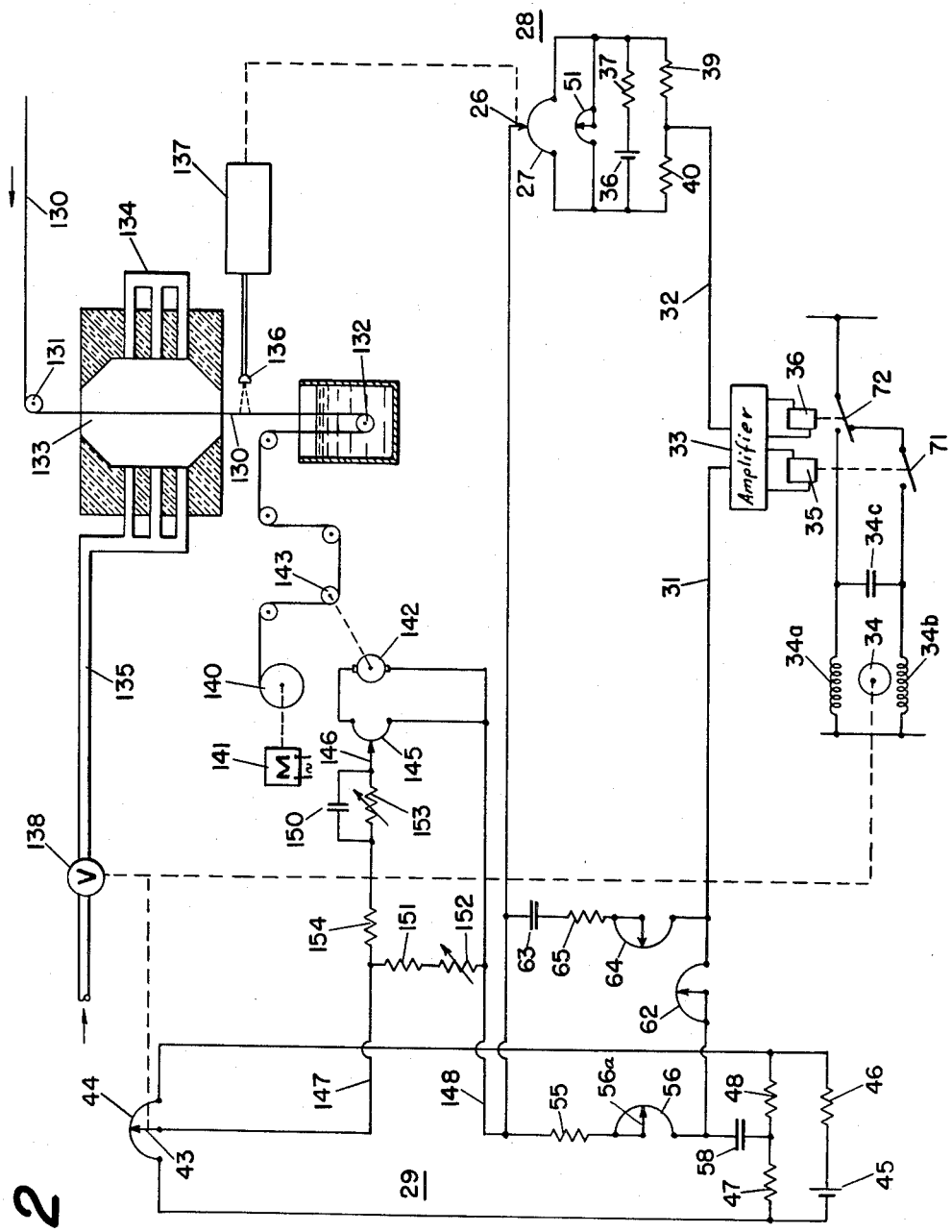

In Fig. 2 the invention has been illustrated as applied to a system of quite a different type as compared with that of Fig. 1. In the treatment of thin ferrous metal which has been coated with tin, it is desirable to elevate the temperature of the tin plating to cause it to flow both for brightness and for better coverage of the ferrous metal. As shown in Fig. 2, a strip of thin metal 130 from a supply roll (not shown) is threaded over rollers 131 and 132, the strip passing through a heater 133 having circumferential headers 134 with a plurality of inlets for the burning of gaseous fuel supplied through fuel-supply line 135. The heater 133, having opposed banks of burners, is of the type in which the gas flames thoroughly consume the fuel with high radiant heat applied to the opposite sides of the thin metallic strip 130. Close regulation of the temperature of the strip is required. Though the temperature thereof may be measured in several different ways, a radiation pyrometer 136 has been illustrated as receiving radiant heat from the strip 130, a temperature recorder 137 of any suitable type being effective in the same manner as described in Fig. 1 to indicate and record the temperature, as well as relatively to adjust the position between contact 26 and its associated slidewire 27.

If a change in temperature of the strip 130 occurs, the unbalance resulting from movement of contact 26 causes energization of motor 34 to change the setting of a fuel-adjusting means 138, shown as a throttling valve, to change the generation of heat within heater 133 in a direction to maintain the temperature of the strip 130 at a predetermined value. The motor 34 is shown as of the alternating-current type, provided with forward and reverse windings 34a and 34b and with a condenser 34c. Relays 35 and 36 serve as reversing contactors to change the direction of rotation of motor 34 in accordance with the direction of unbalance of the signal applied to the input circuit 31, 32 of amplifier 33. The adjustment between contact 43 and slidewire 44 functions in the same manner as in Fig. 1 upon operation of motor 34 to introduce proportional control action, and the capacitor 58 is provided for reset control action, while resistor 62 and capacitor 63 provide rate action, all in the same manner as in Fig. 1.

Superimposed upon the aforesaid control actions are added anticipatory control actions derived not from the temperature of the metal strip 130, but from a different condition, variation of which will affect the temperature of strip 130. As illustrated, with change of speed of strip 130 on a take-up roll 140 driven by any suitable means, such as motor 141, the temperature of the strip will change by reason of a change in the time during which it is subjected to the heat of heater 133. Specifically, as the speed of strip 130 increases, the temperature after passage through heater 133 will be less than for lower speeds. Accordingly, the valve 138 is opened to greater degree to compensate for change in the speed of the strip 130 and to maintain the temperature of the strip 130 constant with variations in speed thereof. This is accomplished by driving a tachometer-generator 142 from a pulley 143 and applying the voltage, or a fractional part thereof, to the control network to modify the above-described adjustment of valve 138. As shown, the voltage of the tachometer-generator 142 is applied to a slidewire 145, and a selected fraction thereof is applied by contact 146 to the control network between conductors 147 and 148. Thus, the voltage appearing across conductors 147 and 148 unbalances the network 29 and applies to the amplifier 33 a signal for rotating the motor 34 in the correct direction to adjust the valve 138 to compensate for the change in speed of strip 130. As shown, the extent of adjustment of valve 138 due to a change in speed of the strip 130 will be not only proportional to the magnitude of the speed change but also will include a component proportional to the rate of said change. The rate action is introduced by capacitor 150 and resistors 151 and 152, the latter being adjustable. The setting of resistor 153 will vary the magnitude of the proportional action. Variation in the value of resistor 152 varies the rate action and the proportional action. Thus, resistors 152 and 153 may be "ganged" for simultaneous adjustment thereof. They then serve to vary the rate action without change in the proportional action.

If the speed of strip 130 be rapidly changing, the current flow through capacitor 150 will change at corresponding rate to increase the potential difference across conductors 147 and 148 to a greater degree than with a slowly changing voltage. When the strip 130 is moving at constant speed, steady-state conditions, the voltage appearing between contact 146 and conductor 148 divides as between resistors 153 and 154 and resistors 151 and 152. However, with the change in voltage, the voltage drop or potential difference between conductors 147 and 148 is increased by reason of the additional current path by way of condenser 150 effective during change in voltage applied thereto.

While the system of Fig. 2 includes but one variable condition other than the temperature of the strip 130, it is to be understood that the principles involved are applicable where still other conditions may be usefully employed in modification of the operation of the compensating means or the final control element, such as valve 138. It is to be further understood that the modification of circuit balance may be introduced between, or in network 28, or in network 29, or in both of them, as desired. An advantage of including the auxiliary control action as shown in Fig. 2 is that the modifying signal is not affected by the reset action of capacitor 58 or of the rate action provided by resistor 62 and capacitor 63.

Figure 3:
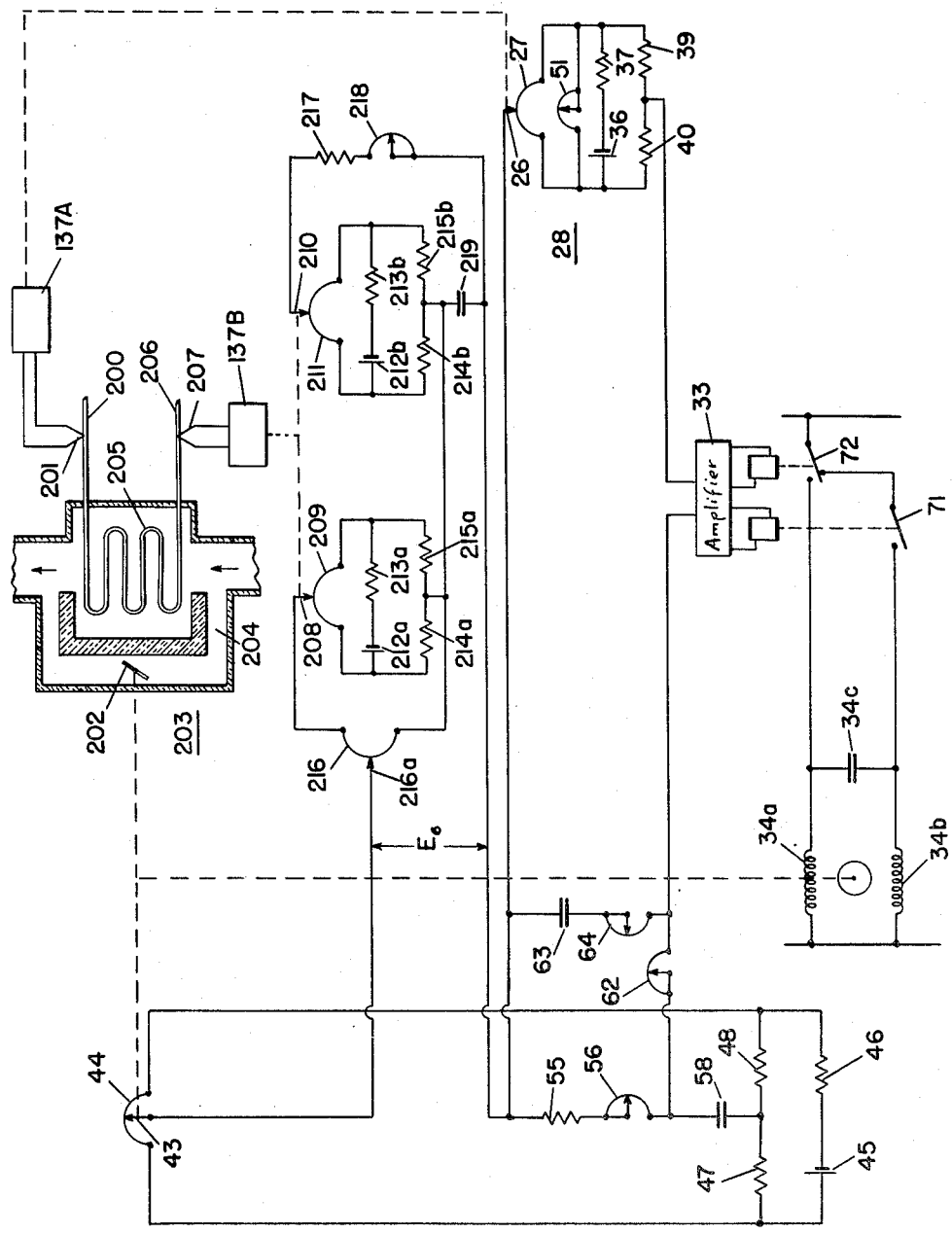

Referring now to Fig. 3, there has been illustrated a further modification in which the additional anticipatory control signal has been introduced into the control network 29 in manner similar to the system of Fig. 2, but instead of introducing a control action in accordance with the rate of change of the controlled variable, the system of Fig. 3 introduces a separate control action having a proportional component and a reset component. More particularly, in Fig. 3 the controlled variable has been represented as the temperature of super-heated steam flowing in outlet pipe 200 measured by a thermocouple 201 and a measuring system preferably of the recorder type as indicated at 137A which, in manner similar to those previously described, relatively adjusts slidewire 27 and its associated contact 26. The final control unit or element in Fig. 3 comprises an adjustable damper 202 which controls the division of hot combustion gases flowing into the super-heater section 203 as between a by-pass 204 and the section including the super-heater coil 205. The temperature of the super-heated steam in pipe 200 will be changed if there is variation in temperature of the steam entering the super-heater coil by way of steam generator pipe 206. Accordingly, additional anticipatory control actions are introduced in response to change of inlet temperature as detected by a thermocouple 207 mounted in pipe 206.

A temperature-measuring apparatus 137B, similar to apparatus 137 of Fig. 2 or the corresponding apparatus of Fig. 1, relatively adjusts contacts 208 and 210 relative to their associated slidewires 209 and 211. Respectively associated with them are batteries 212a, 212b, resistors 213a, 213b, and resistors 214a, 215a and 214b, 215b forming potentiometer networks. A third slidewire 216 is connected between contact 208 and the juncture of resistors 214a and 215a. Connected between contact 210 and the juncture of resistors 214b and 215b is a series-circuit including resistor 217, slidewire 218, and a reset capacitor 219. Upon adjustment of contact 208 a component of the voltage $E_6$ introduced into network 29 will be proportional to the extent of movement of contact 208 away from its midposition (the assumed position for zero voltage applied across the slidewire 216). A component of the voltage $E_6$ will be developed by the capacitor 219 due to the charging thereof through the series-circuit previously traced. Thus, the voltage $E_6$ modifies the control action introduced by network 29 to introduce a proportional control action affecting the adjustment of the final control element 202 and a reset action due to the change in value of a variable, the temperature of the steam entering line 206 which changes due to causes independent of the change in temperature of the steam in line 200. The magnitude of the independently introduced proportional action may be adjusted by changing the position of contact 216a relative to slidewire 216, while the rate of change of the independently introduced reset action may be adjusted as desired by changing the resistance value of the slidewire 218 in the series-circuit.

The remaining part of the system of Fig. 3 functions in the same manner as the corresponding parts of the system of Fig. 2 in that capacitor 63 and resistor 62 introduce rate action, while capacitor 58 and resistors 55 and 56 introduce reset action, the latter components of rate action and reset action being related to the change in the temperature of the super-heated steam in line 200. There is also included the proportional action already described.

Figure 4:
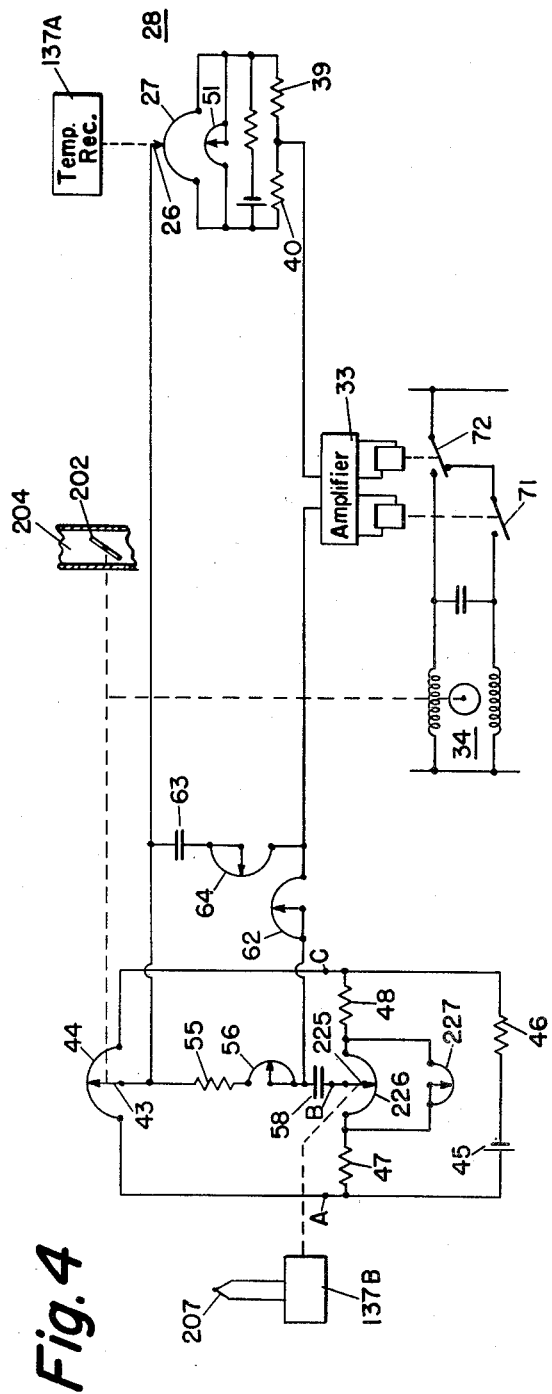

In the modification of Fig. 4 only the damper 202 and a part of the by-pass duct 204 have been illustrated, it being understood that the invention has been applied to the same kind of super-heater section as illustrated in Fig. 3. In accordance with the modification of Fig. 4, the parts common to the system of Figs. 1–3 function in similar manner, but instead of introducing an independent variable between contact 43 and reset resistors 55 and 56, an anticipatory control action from the independent variable is introduced as by the temperature-measuring system and recorder 137B which serves relatively to adjust contact 225 relative to its slidewire 226 which is electrically connected in the circuit below the points A, B, C and between resistors 47 and 48. Thus, upon adjustment of contact 225, the electrical effect is the same as occurs upon adjustment of contact 43. Accordingly, the independent variable as introduced in the network of Fig. 4 is effective to introduce a proportional control action, the magnitude of which may be changed as desired by varying the resistance of slidewire 227.

Figure 5:
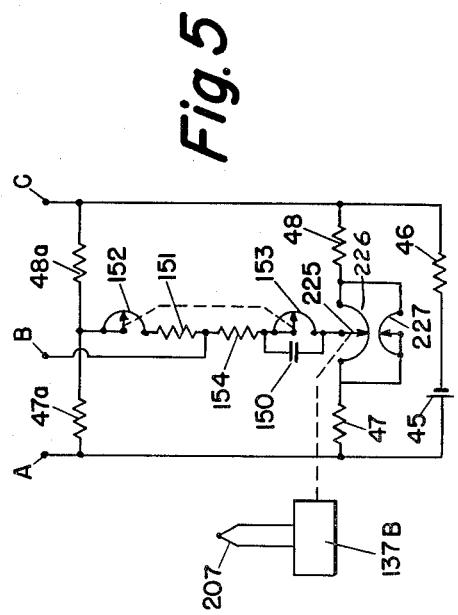

If rate action and proportional action are desired from the independent variable, the system of Fig. 4 may be modified as shown in Fig. 5 by substituting in Fig. 4 at the points A, B and C the network of Fig. 5.

Between slidewire contact 225 and the midpoint between voltage-dividing resistors 47a and 48a there is connected a circuit including slidewires 152 and 153, resistors 151 and 154 and a capacitor 150 connected in shunt across the slidewire 153. The adjustment of slidewire contact 225 will introduce the proportional action already described, while the inclusion of the capacitor 150 and the associated parts of the circuit introduce a rate action in the same manner as previously described in connection with Fig. 2.

Figure 6:
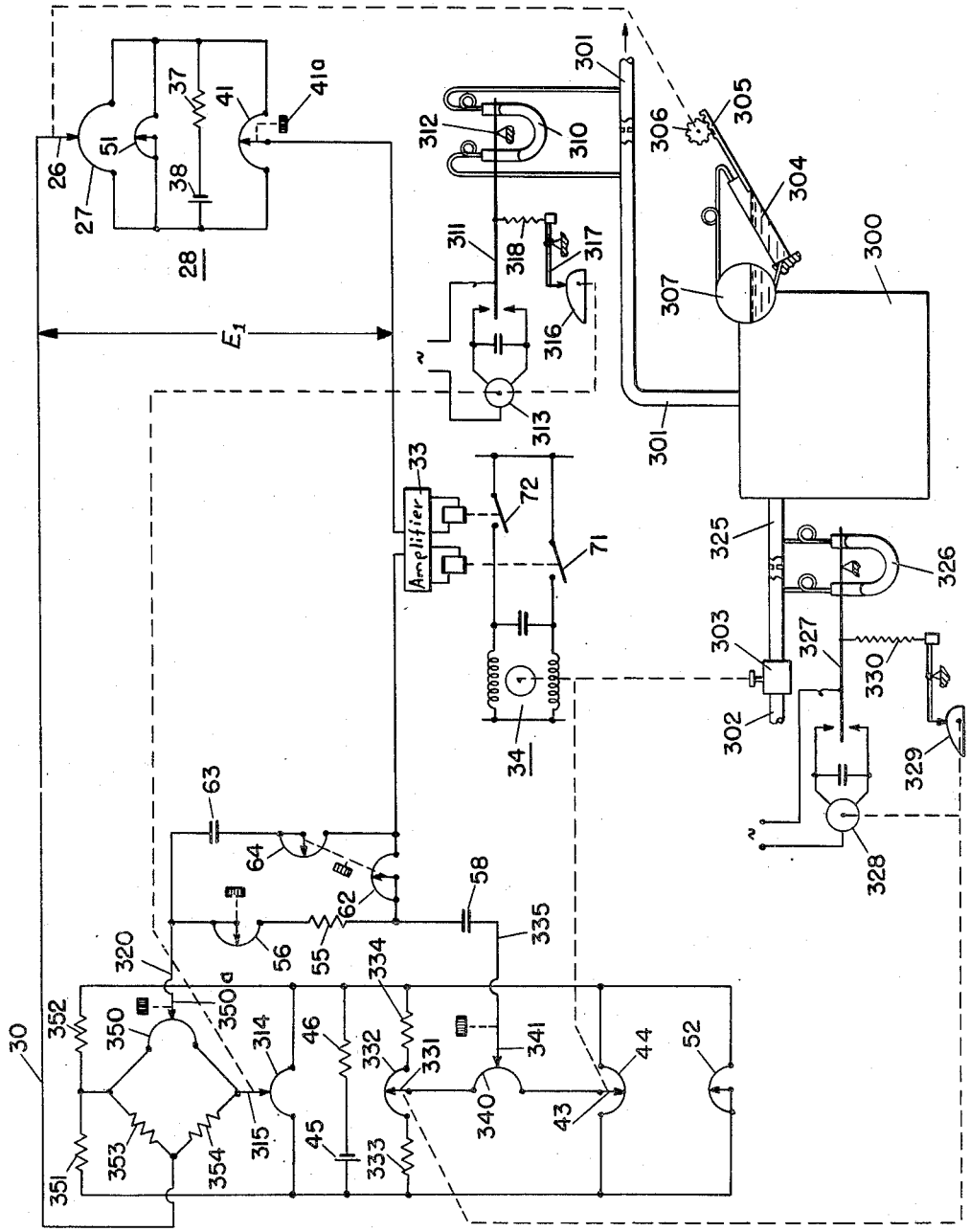

With the above understanding of the many different ways in which the invention may be applied to meet the requirements of a variety of different applications, reference will now be had to Fig. 6 in which a plurality of variables are utilized to introduce control actions into the control network 29. As representative of an application in which there are many variables, there has been illustrated the steam-generating system including a steam generator or a boiler 300 delivering steam through an outlet line 301. Boiler feed water enters through a supply line 302 under the control of a throttling valve 303. A liquid-level indicator 304 of the type including a thermally expanding element, is provided. It operates through suitable means such as a mechanical linkage diagrammatically illustrated as rack and pinion gears 305 and 306 to adjust slidewire contact 26 in accordance with change in liquid level in the boiler drum 307. The slidewire 27 associated with contact 26 is included in the control network 28 which corresponds with similarly numbered networks in the preceding modifications. The slidewire 41 adjustable by knob 41a is a control point setter and is used as previously described to fix a set point corresponding to the level to be maintained in the drum 307. Thus, the liquid-level in drum 307 is in this instance taken as the controlled variable.

An anticipatory control action resulting from change in flow of the steam in line 301 is detected by a tilting manometer 310 which operates in manner similar to the tilting manometer 92 of Fig. 1, except that the lever 311 fulcrumed at 312, instead of positioning a core completes an electrical circuit through one or the other of associated stationary contacts for forward or reverse rotation of a motor 313. The motor relatively adjusts the position of a slidewire 314 and its associated contact 315 and positions a cam 316 relative to a pivoted lever 317. The cam varies the tension in a spring 318 in a direction to oppose the change in position of lever 311 produced by manometer 310. The cam 316 and spring 318 introduce mechanical feedback to the mechanical system to restore balance after a change in position of manometer 310 resulting from a change in flow of steam in line 301. Thus, with the cam 316 having a cam surface varying with the square of change in position as produced by change in steam flow, there is produced linear adjustment of contact 315 of slidewire 314 in accordance with change in steam flow. The change in position of contact 315 varies the voltage at conductor 320 included in circuit with reset resistors 56 and 55 and in circuit with rate capacitor 63.

It will be remembered that the liquid-level in drum 307 was taken as the controlled variable. The manipulated variable is the rate of flow of feed water to the boiler 300, and the motor 34 adjusts the valve 303 to adjust the rate of flow of feed water in accordance with the output of the amplifier 33. However, change in rate of flow of the feed water is dependent not only upon the position of valve 303, but also upon the pressure on the feed water in supply line 302. Accordingly, if there is a pressure change in line 302, or for other reasons the rate of flow to the boiler departs from that which might be ordinarily anticipated by the valve position alone, the system will fail to regulate in a wholly satisfactory manner. However, by including in inlet line 325 a tilting type of manometer 326 responsive to change in flow of liquid in line 325, an additional control action is introduced in the network 29. This manometer, similar to manometer 310, moves a lever 327 between one or the other of a pair of stationary contacts to energize the motor 328 for rotation in one direction or the other to position the cam 329 and to vary the tension on the spring 330 in a direction to oppose the movement produced by the manometer 326.

The motor 328 also relatively adjusts contact 331 and slidewire 332 connected in the network between voltage-dividing resistors 333 and 334 to modify the voltage appearing between conductors 320 and 335. It will be observed that upon energization of motor 34 under the control of amplifier 33, the valve slidewire 44 is adjusted to rebalance the input signal to the amplifier 33. By including a slidewire 340 between contacts 43 and 331 and connecting line 335 to its associated movable contact 341, a further adjustment is provided, namely, an adjustment varying the effect of valve position and rate of flow of feed water upon the overall control. If contact 341 be at the lower extreme position on slidewire 340, the position of valve 303 will have maximum effect, while change in position of contact 331 on slidewire 332 will have minimum effect. With contact 341 at its upper extreme position, the situation is reversed, and the position of valve slidewire 44 will have minimum effect, while the slidewire 332 associated with the feed water flow-rate manometer 326 will have maximum effect. By intermediate adjustment of contact 341 there will be realized joint response from both feed water flow and feed water valve position. A fairly close linear change in rate of flow of feed water in line 325 with change in level of feed water in drum 307 will be achieved as the effect of slidewire 332 is increased and the effect of slidewire 44 decreased.

In addition to the several controls which have been described, it is frequently desirable to modify the control action as a whole in accordance with the load demand on the steam generator 300.

It will be recalled that the contact 315 relative to slidewire 314 is positioned in response to change in rate of flow in steam outlet pipe 301. The extent of modification of the control action could be modified in the same manner as described in connection with slidewires 44 and 332 by connecting only a slidewire 350 between voltage-dividing resistors 351 and 352. As illustrated, however, the slidewire 350 is shown forming adjacent arms of a Wheatstone bridge, the other two arms including resistors 353 and 354. With contact 350a in its midposition, the bridge will be in balance, and the effect of the position of contact 315 on slidewire 314 will not result in a change in the potential between conductors 30 and 320. However, if contact 350a be adjusted in one direction from its mid-point, the polarity of the voltage derived from slidewire 314 and introduced between conductors 30 and 320 will be in one direction, while adjustment of contact 350a in the other direction from its midpoint will reverse the polarity. As this voltage is introduced in series with voltage $E_1$, determined by drum level, its effect is to change or bias the drum level control point as established by the position of contact 41a along slidewire 41. Thus, by adjustment of contact 350a, the control point can be automatically varied to produce a higher level of liquid in drum 307 or a lower level for a given change in flow rate of steam in line 301. Ordinarily, contact 350a will be adjusted to maintain a higher level for higher rates of flow of steam in line 301 and a lower level for the lower rates of flow. Electrically, the effect of the adjustment of contact 350a changes the bias between control systems 28 and 29, and thus electrically functions in much the same manner as the change in the position of control point setter comprising slidewire 41.

While a number of modifications have been shown, it is to be understood that further modifications may be made, all within the scope of the appended claims.

What is claimed is:

1. A control system having an amplifier to the input circuit of which there is applied an electrical potential, said control system being characterized by the provision of reset resistor means connected to said input circuit for developing another electrical potential opposing the first-named potential, a source of voltage adjustable in accordance with change in the output of said amplifier, a reset capacitor, a circuit between said reset resistor means and said source of voltage including a path having therein said reset capacitor for controlling the magnitude of said second-named potential, auxiliary signal-producing means for producing a potential of variable magnitude and of reversible polarity, and means connected in said circuit between said reset resistor means and said adjustable source of voltage for applying said last-named potential in series with said adjustable voltage.

2. A control system for maintaining the magnitude of a condition at a predetermined value provided with anticipatory control from an independently variable auxiliary condition tending to affect the magnitude of said controlled condition, comprising means for producing a first control signal proportional to the magnitude of said controlled condition, adjustable means for varying the supply of a condition-controlling agent, means for producing a second control signal proportional to the position of said adjustable means, signal-responsive means controlled by said first and said second control signals for positioning said adjustable means, resistance-capacitance means connected in circuit with said second control signal-producing means for modifying said second control signal to position said adjustable means in accordance with a time function of the deviation of the magnitude of said condition from said predetermined value, means operable independently of the magnitudes of said first and of said second control signals for producing a third control signal in accordance with the magnitude of said auxiliary condition, and circuit connections for inserting said third control signal in circuit with said first and second control signals for operation of said adjustable means as a function of all three of said control signals.

3. The combination set forth in claim 2 in which resistance-capacitance means is connected in circuit with said third signal-producing means for varying said third control signal to further modify operation of said adjustable means in accordance with a time function of a deviation of the magnitude of said auxiliary condition.

4. The combination set forth in claim 3 in which said time functions represent respectively the integral with respect to time of said first-named condition and of said auxiliary condition.

5. The combination set forth in claim 3 in which said time functions include the integral with respect to time and also the derivative with respect to time both of said first-named condition and of said auxiliary condition.

6. The combination set forth in claim 3 in which at least one of said time functions includes the derivative with respect to time of one of said conditions.

7. The combination set forth in claim 3 in which said time functions include the integral with respect to time and also the derivative with respect to time both of said first-named condition and of said auxiliary condition and in which there is provided adjustable means for applying a variable fraction of said third signal for modification of said first and second signals.

8. A control system for maintaining the magnitude of a controlled variable at a predetermined value and with anticipatory control from independently variable auxiliary conditions which tend to affect the magnitude of said controlled variable, comprising means responsive to change in the magnitude of said controlled variable from a control point for producing a first control signal of magnitude related to the extent of the deviation, a final control element for varying a condition-controlling agent affecting the magnitude of said controlled variable, means operable in accordance with change in position of said final control element for developing a second control signal of magnitude related to the extent of change in position of said final control element, actuating means responsive to the relative magnitudes of said first and said second control signals for controlling the positioning of said final control element, signal-producing means responsive to independently variable auxiliary conditions for developing control signals upon variation of each of them, and circuit connections including resistance-capacitance means for modifying the relative magnitudes of said auxiliary control signals for operation of said actuating means as a function of said first and of said second and of said modified auxiliary signals.

9. The combination set forth in claim 8 in which there are associated with said auxiliary signal-producing means circuit elements for applying selected fractional parts of said auxiliary signals to said circuit connections for predetermining the extent of modification thereby of said adjustment of said actuating means.

10. A control system for maintaining the magnitude of a controlled variable at a predetermined value comprising means responsive to change in the magnitude of said controlled variable from a control point for producing a first control signal of magnitude related to the extent of the deviation, an adjustable final control element for varying a condition-controlling agent affecting the magnitude of said controlled variable, means responsive to the load upon the system for varying said control point in accordance with load demand, means for rendering said last-named means effective to adjust said control point in a selected direction, means operable in accordance with change in position of said final control element for developing a control signal of magnitude related to the extent of change in position of said final control element, and actuating means responsive to the relative magnitudes of said first and said second control signals for controlling the adjustment of said final control element to maintain said controlled variable at the effective control point.

11. The combination set forth in claim 10 in which there are provided signal-producing means responsive to independently variable auxiliary conditions for developing control signals upon variation of each of them for predetermined values, and circuit connections including resistance-capacitance means for modifying the relative magnitudes of said first and said second control signals for operation of said actuating means as a function of said first and of said second and of said auxiliary signals.

12. A control system for maintaining the magnitude of a controlled variable at a predetermined value comprising means responsive to change in the magnitude of said controlled variable from a control point for producing a first control signal of magnitude related to the extent of the deviation, an adjustable final control element for varying a condition-controlling agent affecting the magnitude of said controlled variable, means responsive to the load upon the system for varying said control point in accordance with load demand, means including a Wheatstone bridge for rendering said last-named means effective to adjust said control point in a selected direction, means operable in accordance with change in position of said final control element for developing a control signal of magnitude related to the extent of change in position of said final control element, and actuating means responsive to the relative magnitudes of said first and said second control signals for controlling the adjustment of said final control element to maintain said controlled variable at the effective control point.

13. A control system for maintaining the magnitude of a controlled variable at a predetermined value comprising means responsive to change in the magnitude of said controlled variable from a control point for producing a first control signal of magnitude related to the extent of the deviation, an adjustable final control element for varying a condition-controlling agent affecting the magnitude of said controlled variable, means responsive to the load upon the system for varying said control point in accordance with load demand, means including a Wheatstone bridge for rendering said last-named means effective to adjust said control point in a selected direction, said bridge having a first adjustable resistor for determining the direction of unbalance upon a given change in said load demand, and having associated therewith a second adjustable resistor for applying thereto a potential difference representative of the magnitude of an independent variable which affects the magnitude of said controlled variable, means operable in accordance with change in position of said final control element for developing a control signal of magnitude related to the extent of change in position of said final control element, and actuating means responsive to the relative magnitudes of said first and said second control signals for controlling the adjustment of said final control element to maintain said controlled variable at the effective control point.

14. A control system for maintaining the magnitude of a controlled variable at a predetermined value comprising an adjustable final control element for changing the magnitude of said variable, means including a control slidewire for producing a control potential of magnitude related to the extent of deviation of the controlled variable from a control point, means including a follow-up slidewire adjustable with change in position of said final control element for developing a follow-up potential, an amplifier having an output circuit and an input circuit in which said potentials are applied in opposing relationship, means connected to said output circuit of said amplifier for adjusting said final control element, means for establishing a predetermined relationship between the adjustment of said final control element with predetermined changes in the position of said control slidewire, a reset resistor and a reset capacitor connected in a series circuit including them and said follow-up slidewire, circuit means connected in said series circuit for development therein of a potential difference for auxiliary adjustment of said final control element, means responsive to change in the magnitude of an auxiliary condition for varying the magnitude of said potential difference, and adjustable means for said circuit means for relatively changing in said series circuit the magnitude of said potential difference for predetermined changes of said auxiliary condition without changing said relationship between the adjustment of said final control element and said control slidewire.

15. The combination set forth in claim 14 in which said circuit means comprises a resistor, the effective resistance of which in said series circuit is adjustable without changing the magnitude of said follow-up potential introduced by said follow-up slidewire in the absence of change in position of said final control element.

16. A control system for maintaining the magnitude of a controlled variable at a predetermined value comprising an adjustable final control element for changing the magnitude of said variable, means including a control slidewire for producing a control potential of magnitude related to the extent of deviation of the controlled variable from a control point, means including a follow-up slidewire adjustable with change in position of said final control element for developing a follow-up potential, an amplifier having an output circuit and an input circuit in which said potentials are applied in opposing relationship, means connected to said output circuit of said amplifier for adjusting said final control element, means for establishing a predetermined relationship between the adjustment of said final control element with predetermined changes in the position of said control slidewire, a reset resistor and a reset capacitor connected in a series circuit including them and said follow-up slidewire, said reset resistor being connected to said input circuit for development therein of a voltage equal and opposite to said control potential, circuit means connected in said series circuit for development therein of a potential difference for auxiliary adjustment of said final control element, means responsive to change in the magnitude of an auxiliary condition for varying the magnitude of said potential difference, and adjustable means for said circuit means for relatively changing in said series circuit the magnitude of said potential difference for predetermined changes of said auxiliary condition without changing said relationship between the adjustment of said final control element and said control slidewire.

17. The combination set forth in claim 16 in which said circuit means comprises a resistor, the effective resistance of which in said series circuit is adjustable without changing the magnitude of said follow-up potential introduced by said follow-up slidewire in the absence of change in position of said final control element.

18. The combination set forth in claim 16 in which said adjustable means comprises a variable resistor connected in shunt with said circuit means.

19. The combination set forth in claim 16 in which resistance-capacitance means are connected to said circuit means for modifying the potential developed in said series circuit in accordance with a time function of a deviation of the magnitude of said auxiliary condition.

20. A control system for maintaining the magnitude of a controlled variable at a predetermined value comprising an adjustable final control element for varying the magnitude of a control agent which is applied to change the magnitude of said controlled variable, means including a control slidewire for producing a control potential of magnitude related to the extent of deviation of the controlled variable from a control point, means including a follow-up slidewire adjustable with change in position of said final control element for developing a first follow-up potential, means including a follow-up slidewire adjustable with change in magnitude of the control agent for developing a second follow-up potential, an amplifier having an output circuit and an input circuit, and means including a voltage divider for applying an opposing potential to said input circuit composed of predetermined fractional components of said first and second follow-up potentials, said potential-applying means including a reset resistor and a reset capacitor connected in a series circuit including said reset resistor and said voltage divider.

21. A control system for maintaining the magnitude of a controlled variable at a predetermined value comprising an adjustable final control element for varying the magnitude of a control agent which is applied to change the magnitude of said controlled variable, means including a control slidewire for producing a control potential of magnitude related to the extent of deviation of the controlled variable from a control point, means including a follow-up slidewire adjustable with change in position of said final control element for developing a first follow-up potential, means including a follow-up slidewire adjustable with change in magnitude of the control agent for developing a second follow-up potential, an amplifier having an output circuit and an input circuit, means including a voltage divider for applying an opposing potential to said input circuit composed of predetermined fractional components of said first and second follow-up potentials, said potential-applying means including a reset resistor and a reset capacitor connected in a series circuit including said reset resistor and said voltage divider, circuit means connected in said series circuit for development therein of a potential difference for auxiliary adjustment of said final control element, means responsive to change in the magnitude of an auxiliary condition for varying the magnitude of said potential difference, and adjustable means for said circuit means for relatively changing in said series circuit the magnitude of said potential difference for predetermined changes of said auxiliary condition without changing said relationship between the adjustment of said final control element and said control slidewire.

References Cited in the file of this patent

UNITED STATES PATENTS

| Number | Name | Date |
|---|---|---|
| 2,175,985 | Callender et al. | Oct. 10, 1939 |
| 2,491,606 | Dickey et al. | Dec. 20, 1949 |
| 2,525,967 | Smoot | Oct. 17, 1950 |